(12) United States Patent
Wyss et al.

(10) Patent No.: US 11,714,965 B2
(45) Date of Patent: Aug. 1, 2023

(54) SYSTEM AND METHOD FOR MODEL DERIVATION FOR ENTITY PREDICTION

(71) Applicant: Genesys Telecommunications Laboratories, Inc., Daly City, CA (US)

(72) Inventors: Felix Immanuel Wyss, Zionsville, IN (US); Aravind Ganapathiraju, Hyderabad (IN); Pavan Buduguppa, Hyderabad (IN)

( * ) Notice: Subject to any disclaimer, the term of this patent is extended or adjusted under 35 U.S.C. 154(b) by 316 days.

(21) Appl. No.: 16/677,989

(22) Filed: Nov. 8, 2019

(65) Prior Publication Data

US 2020/0151248 A1  May 14, 2020

Related U.S. Application Data

(60) Provisional application No. 62/757,952, filed on Nov. 9, 2018.

(51) Int. Cl.

| | |
|---|---|
| *G06F 40/295* | (2020.01) |
| *H04L 51/02* | (2022.01) |
| *G06F 40/253* | (2020.01) |
| *G06N 3/044* | (2023.01) |
| *G06N 3/08* | (2023.01) |

(52) U.S. Cl.
CPC .......... *G06F 40/295* (2020.01); *G06F 40/253* (2020.01); *G06N 3/044* (2023.01); *H04L 51/02* (2013.01); *G06N 3/08* (2013.01)

(58) Field of Classification Search
CPC ... G06F 40/295; G06F 40/253; G06N 3/0445; G06N 3/08; H04L 51/02
See application file for complete search history.

(56) References Cited

U.S. PATENT DOCUMENTS

| | | | | |
|---|---|---|---|---|
| 2012/0166942 A1* | 6/2012 | Ramerth | .............. | G06F 40/169 715/257 |
| 2013/0288722 A1* | 10/2013 | Ramanujam | ............ | H04W 4/12 455/466 |
| 2015/0279366 A1* | 10/2015 | Krestnikov | ............. | G10L 15/26 704/235 |
| 2018/0189267 A1* | 7/2018 | Takiel | ................... | G06F 40/211 |
| 2019/0043486 A1* | 2/2019 | Salloum | ................. | G10L 15/16 |

OTHER PUBLICATIONS

Chiu et al., "Named Entity Recognition with Bidirectional LSTM-CNNs" (Year: 2016).*
Vinyals et al., "Showand Tell: A Neural Image Caption Generator" (Year: 2015).*

(Continued)

*Primary Examiner* — Bhavesh M Mehta
*Assistant Examiner* — Edward Tracy, Jr.

(57) ABSTRACT

A system and method are presented for model derivation for entity prediction. An LSTM with 100 memory cells is used in the system architecture. Sentences are truncated and provided with feature information to a named-entity recognition model. A forward and a backward pass of the LSTM are performed, and each pass is concatenated. The concatenated bi-directional LSTM encodings are obtained for the various features for each word. A fully connected set of neurons shared across all encoded words is obtained and the final encoded outputs with dimensions equal to the number of entities is determined.

21 Claims, 4 Drawing Sheets

(56) References Cited

OTHER PUBLICATIONS

Poria et al., "Deep Convolutional Neural Network Textual Features and Multiple Kernel Learning for Utterance-Level Multimodal Sentiment Analysis" (Year: 2015).*
Wu et al., "Evaluating the Utility of Hand-crafted Features in Sequence Labelling" (Year: 2018).*
Lample et al. "Neural Architectures for Named Entity Recognition" (Year: 2016).*

* cited by examiner

SYSTEM AND METHOD FOR MODEL DERIVATION FOR ENTITY PREDICTION

CROSS REFERENCE TO RELATED APPLICATION

This application claims the benefit of U.S. Provisional Patent Application No. 62/757,952, titled "CONTEXT AWARE NAMED ENTITY RECOGNITION", filed in the U.S. Patent and Trademark Office on Nov. 9, 2018, the contents of which are incorporated herein.

BACKGROUND

The present invention generally relates to telecommunications systems and methods, as well as information extraction from dialog. More particularly, the present invention pertains to named-entity recognition and context awareness.

SUMMARY

A system and method are presented for model derivation for entity prediction. An LSTM with 100 memory cells is used in the system architecture. Sentences are truncated and provided with feature information to a named-entity recognition model. A forward and a backward pass of the LSTM are performed, and each pass is concatenated. The concatenated bi-directional LSTM encodings are obtained for the various features for each word. A fully connected set of neurons shared across all encoded words is obtained and the final encoded outputs with dimensions equal to the number of entities is determined.

In one embodiment, a method is presented for deriving a model for a chatbot for predicting entities in a given sentence comprising a plurality of words wherein the words are separated by space, the method comprising the steps of: inputting the sentence into a named-entity recognition module and truncating the sentence; obtaining features from the truncated sentence; performing a Long Short-Term Memory Recurring Neural Network forward pass on the features to obtain a first set of results; performing a Long Short-Term Memory Recurring Neural Network backward pass on the features to obtain a second set of results; performing a first concatenating on the first set of results and the second set of results; performing a second concatenation on the first concatenation using output target entities, wherein the output target entities are shifted by one step; obtaining a fully connected set of neurons from the second concatenation, which are shared across all encoded words; and obtaining a plurality of encoded outputs with dimensions equal to the number of entities.

The shifting may be performed to the right and zeroes are input into an empty first position. In an embodiment, the Long Short-Term Memory Recurring Neural Network comprises 100 memory cells. The first concatenation results in 200 dimensions. The second concatenation results in a number of dimensions proportionally related to a number of features from the truncated sentence.

The features comprise one or more of: word embeddings, parts-of-speech encoding, special character information, digit count information, digit chunks count information, and fixed-size ordinally forgetting encoding.

In another embodiment, a method is presented for deriving a model for a chatbot for predicting entities in a given sentence comprising a plurality of words wherein the words are separated by space, the method comprising the steps of: inputting the sentence into a named-entity recognition module and truncating the sentence; obtaining features from the truncated sentence; performing a Long Short-Term Memory Recurring Neural Network forward pass on the features to obtain a first set of results; performing a Long Short-Term Memory Recurring Neural Network backward pass on the features to obtain a second set of results; performing a first concatenating on the first set of results and the second set of results; performing a second concatenation on the first concatenation using output target entities, wherein the output target entities are shifted by one step; obtaining a fully connected set of neurons from the second concatenation, which are shared across all encoded words; and inputting the prediction into the performing of the second concatenation step, wherein the method is performed cyclically until all outputs have been processed with input predictions.

The shifting may be performed to the right and zeroes are input into an empty first position. In an embodiment, the Long Short-Term Memory Recurring Neural Network comprises 100 memory cells. The first concatenation results in 200 dimensions. The second concatenation results in a number of dimensions proportionally related to a number of features from the truncated sentence The features comprise one or more of: word embeddings, parts-of-speech encoding, special character information, digit count information, digit chunks count information, and fixed-size ordinally forgetting encoding.

In another embodiment, a method is presented for deriving a model for a chatbot for predicting entities in a given sentence comprising a plurality of words wherein the words are separated by space, the method comprising the steps of: inputting the sentence into a named-entity recognition module and truncating the sentence; obtaining features from the truncated sentence; performing a Long Short-Term Memory Recurring Neural Network forward pass on the features to obtain a first set of results; performing a Long Short-Term Memory Recurring Neural Network backward pass on the features to obtain a second set of results; performing a first concatenating on the first set of results and the second set of results; performing a second concatenation on the first concatenation using output target entities, wherein entities are encoded using multi-hot encoding; obtaining a fully connected set of neurons from the second concatenation, which are shared across all encoded words; and obtaining a plurality of encoded outputs with dimensions equal to the number of entities.

The shifting may be performed to the right and zeroes are input into an empty first position. In an embodiment, the Long Short-Term Memory Recurring Neural Network comprises 100 memory cells. The first concatenation results in 200 dimensions. The second concatenation results in a number of dimensions proportionally related to a number of features from the truncated sentence The features comprise one or more of: word embeddings, parts-of-speech encoding, special character information, digit count information, digit chunks count information, and fixed-size ordinally forgetting encoding.

In another embodiment, a system is presented for deriving a model for a chatbot for predicting entities in a given sentence comprising a plurality of words wherein the words are separated by space, the system comprising: a processor; and a memory in communication with the processor, the memory storing instructions that, when executed by the processor, causes the processor to derive the model by: inputting the sentence into a named-entity recognition module and truncating the sentence; obtaining features from the truncated sentence; performing a Long Short-Term Memory Recurring Neural Network forward pass on the features to obtain a first set of results; performing a Long Short-Term Memory Recurring Neural Network backward pass on the features to obtain a second set of results; performing a first concatenating on the first set of results and the second set of results; performing a second concatenation on the first concatenation using output target entities, wherein the output target entities are shifted by one step; obtaining a fully connected set of neurons from the second concatenation, which are shared across all encoded words; and obtaining a plurality of encoded outputs with dimensions equal to the number of entities.

In another embodiment, a system is presented for deriving a model for a chatbot for predicting entities in a given sentence comprising a plurality of words wherein the words are separated by space, the system comprising: a processor; and a memory in communication with the processor, the memory storing instructions that, when executed by the processor, causes the processor to derive the model by: inputting the sentence into a named-entity recognition module and truncating the sentence; obtaining features from the truncated sentence; performing a Long Short-Term Memory Recurring Neural Network forward pass on the features to obtain a first set of results; performing a Long Short-Term Memory Recurring Neural Network backward pass on the features to obtain a second set of results; performing a first concatenating on the first set of results and the second set of results; performing a second concatenation on the first concatenation using output target entities, wherein entities are encoded using multi-hot encoding; obtaining a fully connected set of neurons from the second concatenation, which are shared across all encoded words; and obtaining a plurality of encoded outputs with dimensions equal to the number of entities.

DETAILED DESCRIPTION

Figure 1:
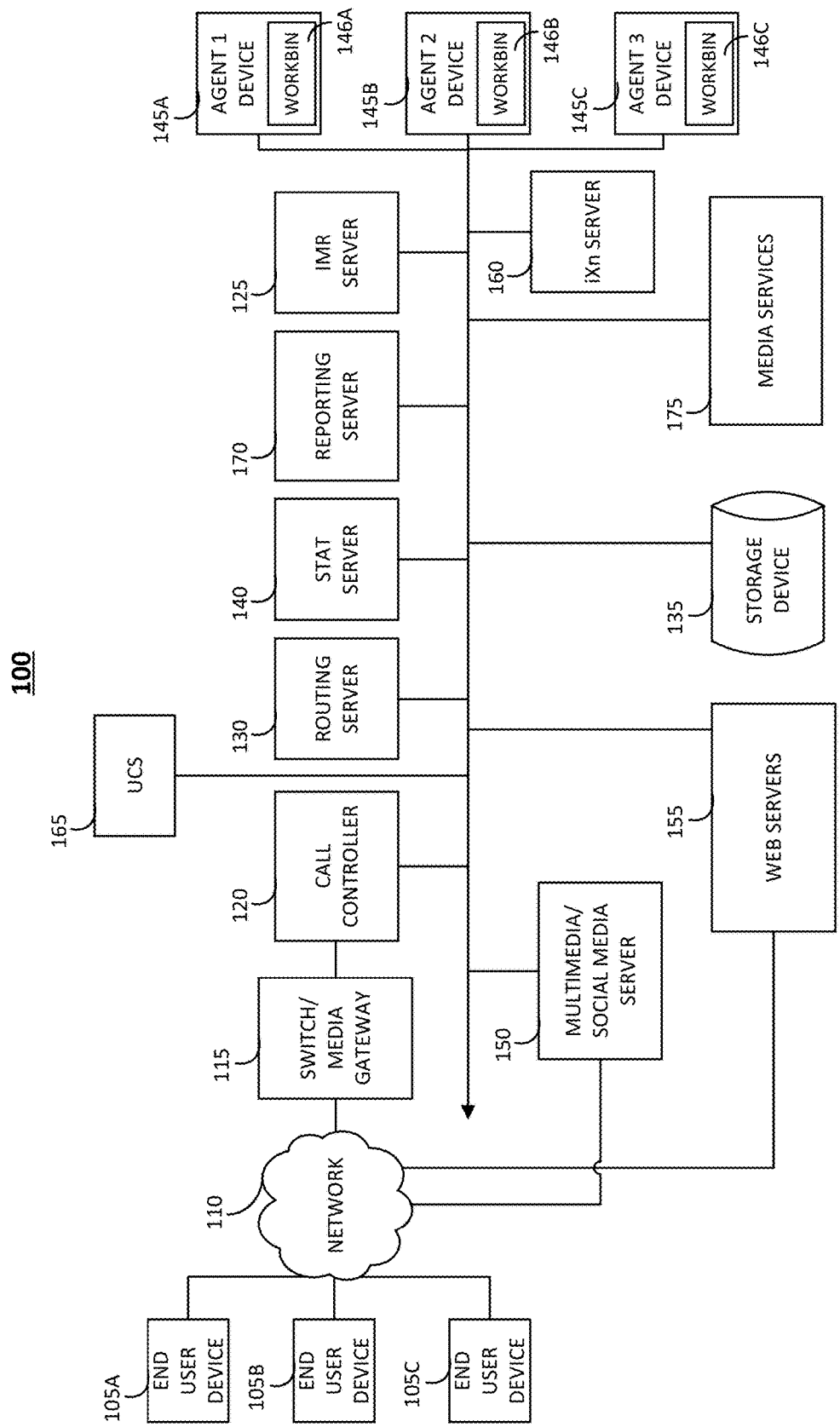
FIG. 1 is a diagram illustrating an embodiment of a communication infrastructure.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Named-entity recognition (NER) is a subtask of information extraction that seeks to locate and classify named entities in text into pre-defined categories such as the names of persons, organizations, locations, expressions of times, quantities, monetary values, percentages, etc. The main use of NER may be to find personally identifiable information in interactions, such as simple text, chat, or transcription of voice calls. NER may also be known in the art as 'entity identification', 'entity chunking', and 'entity extraction'. Research on NER systems has been structured to produce an annotated block of text that highlights the names of entities from an unannotated block of text. In the example text 'Jim bought 300 shares of Acme Corp. in 2006', the annotated text may be: [Jim] Person bought 300 shares of [Acme] Organization [Corp.] Organization in [2006] Time.

From this example in existing research, the name of a person consists of one token, the name of the company consists of two tokens, and a temporal entity have been detected. Marsh, Elaine and Dennis Perzanowski, "MUC-7 Evaluation of IE Technology: Overview of Results", 29 Apr. 1998.

Continuing with this example, the system can be built using a pattern matching system like regular expressions (or RegEx). RegEx comprises a special text string which describes a search pattern. A rule may be written to resolve the entities, for example, ([A-Z][a-z]*)[\s-]([A-Z][a-z]*) which detects names. The rule for detecting organization names may be written as ^([a-zA-Z0-9]|[-@\.#&!])*$. The rule for detecting date entities may be written as ^(1[0-2]|0[1-9]|\d)\/(20\d{2}|19\d{2}|0(?!0)\d|[1-9]\d)$ for detecting months and (20\d{2}|19\d{2}|0(?!0)\d|[1-9]\d) for detecting years.

The system can quickly become unwieldly covering all cases of a given entity. If the RedEx for detecting years detects a standard 2000 to 2009, 1900 to 1999, 01 to 09 and 10 to 99, but if we want to detect years above 2010, the RegEx is modified as /^(1[0-2]|0[1-9]|\d)\/([2-9]\d[1-9]\d|[1-9]\d)$/. If the format of the date is changed to 12/2009, the RegEx fails. It also becomes impractical to handle cases for Names and Organizations with the above regular expression. The RegEx written for detecting names fails if the name does not contain any upper-case characters (e.g., jim vs. Jim and acme vs. Acme).

A Gazetteer list might be able to cure the defect, but such systems are brittle and fail when there is a common name of a person presented as an organization. In the example "Jim bought 300 shares of Jim's corp. in 2006", there is no contextual information for detecting the organization. That is, there is a conflict for the word "Jim", which is succeeded by the word 'corp', which is usually associated with an organization. This could be resolved if a rule was added to make the word "Jim" an organization but adding a rule for each such case becomes time consuming and hard to maintain in case of errors. Thus, there is a need for pursuing data driven techniques for NER.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present.

Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Conditional random fields (CRFs) are a class of statistical modeling method often applied for structured prediction in pattern recognition and machine learning. CRFs fall into the sequence modeling family. Whereas a discrete classifier predicts a label for a single sample without considering "neighboring" samples, a CRF can take context into account such that the linear chain CRF predicts sequences of labels for sequences of input samples. The CFR based NER system has set a strong baseline for modeling contextual information while being a probabilistic model but due to discrete nature of features, there is no information provided to the model in terms of semantic similarity. The CFR system will fail if an unknown word is encountered as well.

In an embodiment, to infuse semantic knowledge into the model, a dense representation for each word is used instead of a discrete one. The dense representation can be used to capture the contextual information. For an NER system, the information can be encoded in the form of "world knowledge' by using a corpus such as the Wikipedia corpus or Google's common crawl data. When used as part of the features, this general knowledge helps the model understand that semantically similar words are possibly close to each other and may belong to the same category. Words may be represented as vectors using methods commonly known in the art such as "Mikolov, Tomas et. al., 'Efficient Estimation of Word Representations in Vector Space'. arXiv: 1301.3781v3 [cs.CL]. 7 Sep. 2013" and "Pennington, Jeffrey et. al., 'Glove: Global Vectors for Word Representation" Proceedings of the 2014 Conference on Empirical Methods in Natural Language Processing. D14-1162. October 2014. p 1532-1543." A pre-trained model may be used for obtaining general word vector representation.

In an embodiment, Recurrent Neural Networks (RNNs), specifically Long Short-Term Memory (LSTMs) are used to model sentences. LSTMs use a memory unit to selectively forget unnecessary information while remembering critical information for a task. A sentence can be of any length with contextual information for a word entity association being present at any end of the sentence. A fixed sentence length size may be determined by computing the number of words present in training data and computing the median number of words per sentence. In typical datasets, this has been empirically observed and set at 25. An LSTM with 100 memory cells is used in an embodiment of the architecture and is illustrated in FIG. 2, discussed in greater detail below.

Other neural networks were examined for sentence modeling; however, they were not as efficient. Simple multi-layered perceptron (MLP) neural networks with explicit context windows have drawbacks such as computational complexity growing exponentially with window size and contextual information being limited to the context window size. As a result, there is a high probability that a word may be associated with the wrong entity if the relevant contextual information is outside the context window. Convolutional neural networks (CNNs) capture context by modeling the word context window similar to MLPs, but instead of using a concatenated set of these features, a fully connected set of neurons act as a shared connection across words and with a deeper architecture and a pooling operation, the context gets captured more effectively with lesser computational cost. However, CNNs still cannot capture the contextual information for a word outside its context window. RNNs address the deficiencies by using a shared hidden state (like the fully connected set of neurons) and do not have a concept of a context window, hence they can model an entire sentence. RNNs examine a sentence word by word sequentially such that it encodes the information of the ith word and its previous word at the ith output. Plain RNNs cannot model long sequences effectively due to the limited number of the hidden state neurons, and thus, the LSTMs are used as mentioned above.

Figure 2:
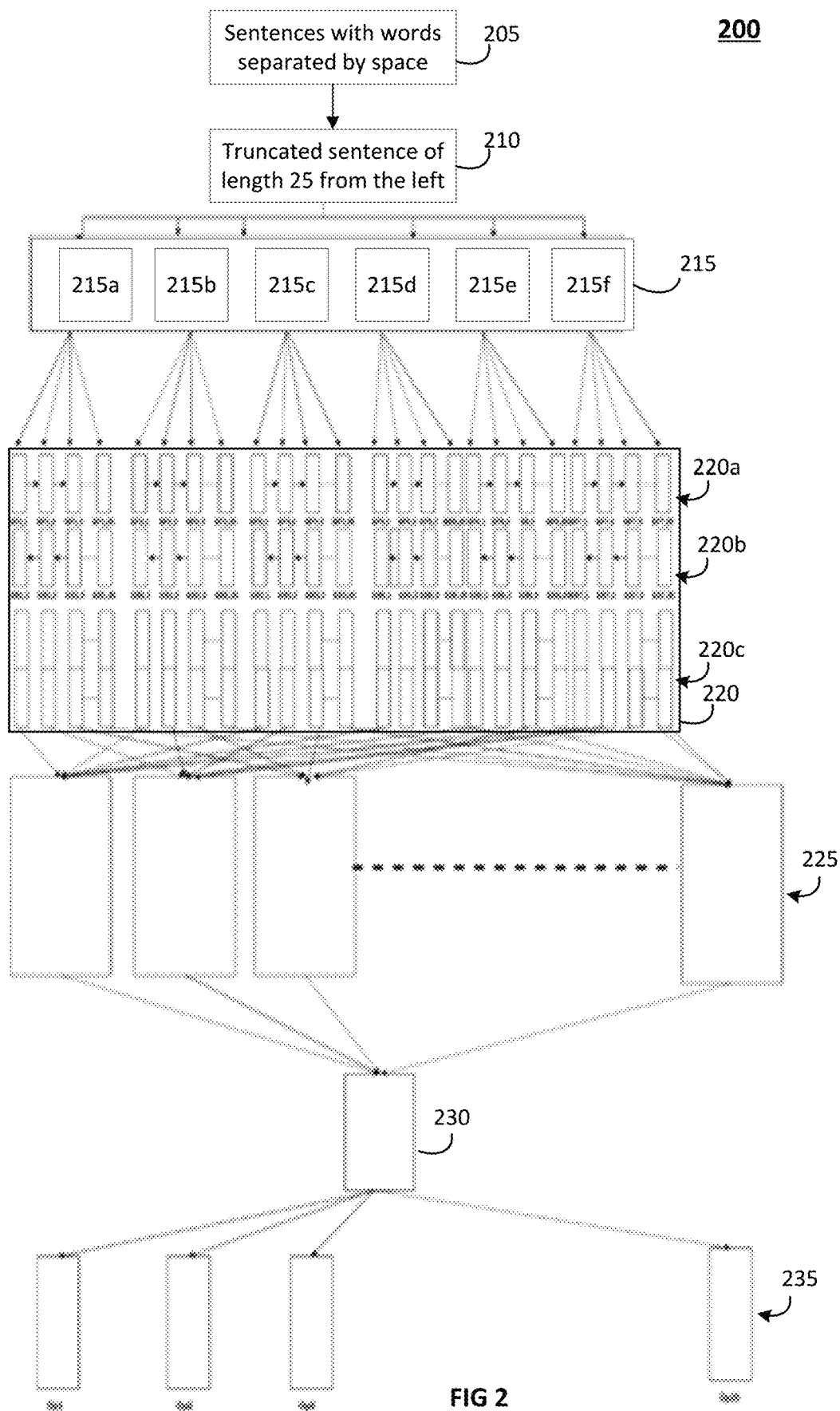
FIG. 2 is a diagram illustrating an embodiment of a model architecture.

FIG. 2 is a diagram illustrating an embodiment of a model architecture, indicated generally at 200. Sentences, from an interaction, with words separated by spaces 205 undergo processing as described above. Truncated sentences are obtained 210. For example, a fixed sentence length size may be determined by computing the number of words present in training data and computing the median number of words per sentence. In an embodiment using typical datasets, for example, this has been empirically observed and set at 25. Feature information 215 is supplied to the model. Features information 215 may further comprise word embeddings 215a, parts of speech encodings 215b, special character encodings 215c, normalized digit count 215d, normalized digit chunks count 215e, and character and word level FOFE 215f.

Syntactic parts of speech encodings 215b comprises 'parts-of-speech' tags which can take care of sentences like "I may go to the party this evening" and "This May we plan to host a party". In the first example ("I may go to the party this evening"), the word 'may' is tagged as a 'Modifier'. In the second example, 'May' is tagged as a Proper Noun.

Special Character information 215c may be encoded for each word. The encoding may be in the form of a multi-hot vector encoding. Special characters encoded may comprise: !, ", #, $, %, &, ', (,), *, etc. For instances, the special character information for the following words may be:

'$14'→[0., 0., 0., 1., 0., 0., 0., 0., 0., 0., 0., 0., 0., 0., 0., 0., 0., 0., 0., 0., 0., 0., 0., 0., 0., 0., 0., 0., 0., 0., 0.]

'15/11/1987'→[0., 0., 0., 0., 0., 0., 0., 0., 0., 0., 0., 0., 0., 1., 0., 0., 0., 0., 0., 0., 0., 0., 0., 0., 0., 0., 0., 0., 0., 0., 0.]

'Acme-corp.'→[0., 0., 0., 0., 0., 0., 0., 0., 0., 0., 0., 0., 1., 1., 0., 0., 0., 0., 0., 0., 0., 0., 0., 0., 0., 0., 0., 0., 0., 0., 0.]

The normalized digit count 215d information may encode the number of digits present in a word. In an embodiment, this may be normalized by dividing it with the maximum digit count across all the words in the dataset. This feature is useful for detecting date, time, and price entities. For example, if the maximum digit count across all the words in the dataset is 10, the following words have these encodings:

$$'15/11/1987' = \text{length of } \{'5', '1', '9', '8', '7'\}/10$$
$$= 5/10 = 0.5$$

Normalized digit chunks count information 215e enriches syntactic features in conjunction with the digit count information present within a word. For example, if the maximum digit chunks count across all the words in the dataset is 10, then '15/11/1987' has three-digit chunks. Those are '15', '11', and '1987'. Hence, this may be encoded as 3/10=0.3.

The Fixed-size Ordinally Forgetting Encoding (FOFE) features 215f are used for typos and language independence. Encoding may be performed by capturing ordinal features by the means of a forgetting factor. For example, Let S={w1, w2, w3, wT} denote a sequence of T words from V, and let t be the one-hot vector of the t-th word in S, where $1 \leq t \leq T$. The FOFE of each partial sequence zt from the first word to the t-th word is recursively defined as:

$$zt = \alpha \cdot zt-1 + et (1 \leq t \leq T) \text{ and, } z0=0.$$

Here, the constant $\alpha$ is the forgetting factor and is chosen between 0 and 1 ($0 < \alpha < 1$). If a higher a is chosen, the encoding would have higher memory, and vice versa. The far-away context would be gradually forgotten due to $\alpha < 1$, and the nearby contexts play much greater role in the FOFE codes. The size of zt is |V| regardless of the value of T. It encodes any variable length sequence to a fixed size representation.

In another example, the vocabulary V consists of 3 words A, B, and C. The one-hot representations of the words are: eA=[1,0,0], eB=[0,1,0] and eC=[0,0,1]. The partial sequences from the first word to the third word are: z1=eA, z2=a.eA+eB, and z3=a2.eA+a.eB+eC. Thus, the FOFE for the sequence "ABC", as calculated from left to right, is:

FOFEABC=z3=α2. [1,0,0]+α. [0,1,0]+[0,0,1]=[α2, α, 1].
Similarly, for the sequence "ABCBC",
FOFEABCBC=α4.eA+α3.eB+α2.eC+a.eB+eC=[α4, α3+α, α2+1]. Thus, for any sequence of length T:
FOFE=αT-1.e1+aT-2.e2+ ... +α2.eT-2+α.eT-1+eT where e1, e2, eT represent the one-hot encoded vectors of $1^{st}$, $2^{nd}$, ... up to Tth words of the sequence. For NER, both word level and character level FOFE are used. Feature generation is performed as follows on the sentence: "I want to book a flight from New York to California on January $25^{th}$". The current fragment is "California". The token-level features are determined as: 1) bag-of-word vector of the current fragment (the one-hot encoding of the token "California" given the vocabulary used), 2) FOFE code of the left context including the current fragment, which is "I want to book a flight from New York to California", 3) FOFE code of the left context excluding the current fragment, which is "I want to book a flight from New York to", 4) FOFE code of the right context including the current fragment, which is "California on January $25^{th}$", and 5) FOFE code of the right context excluding the current fragment, which is "on January $25^{th}$". These FOFE codes are projected to lower-dimension dense vectors based on a projection or embedding matrix Wt. In an embodiment, GloVe 42B 300-dimensional embeddings are used. Each of the features become 300-dimensional after the projection. All the token-level features are then concatenated to form the 1500-dimensional feature vector.

The character-level features for the fragment "California" are determined as: 1) left-to-right FOFE code of the character sequence of the active fragment, which for "California" is "C", "a", "l", ... "i", "a", 2) right-to-left FOFE code (reverse FOFE) of the character sequence, which is "a", "i", "n", ... , "a", "C". These case-sensitive character FOFE codes are also projected by a character embedding matrix Wc, which is randomly initialized. In an embodiment, all 884 characters present in the GloVe 42B vocabulary are used, making each character-FOFE code of 100 dimensions. The embedding matrix is of dimension 100. Thus, after projection, character-FOFE feature vector of 100 dimensions is obtained. In an embodiment, both token-level and character-level feature vectors are concatenated to give the final contextual FOFE features of 1700 dimensions.

The LSTM is represented at 220. A 100-cell LSTM forward pass is performed 220a. A 100-cell backward pass is performed 220b. The Forward and backward pass LSTM encodings are concatenated (200 dimensions) 220c. The concatenated bi-directional LSTM encodings are obtained of various features for each word 225. In an embodiment, there are now 1200 dimensions because there were 6 features used. The second concatenation results in a number of dimensions proportionally related to the number of features selected from the truncated sentence. Thus, if there were 7 features used, for example, 1400 dimensions would result. A fully connected set of neurons shared across all the encoded words is obtained 230. The final encoded outputs with dimensions equal to the number of entities is obtained 235.

In an embodiment, momentum may also be considered in the form of feedback. The model illustrated in FIG. 2 may work in a loop, where the model is presented with the usual features along with output 235 for the previous word at 225. The output target entities are shifted to the right by one step, using all zeros to pad the void at the first positions. Thus, for example, the output for a first word is used as feedback to predict the output for a second word. The output for the first word and the output for the second word are used as feedback to predict the output for the third word, and so forth.

In an embodiment, the context aware models may be used in chatbots when participating in interactions, such as in the case of a contact center chat interaction, or with dialog engines, using the media services 175 or the IMR server 125 (FIG. 1). In the case of a dialog engine, the context aware model may be associated with a directed flow graph in forming the dialog tree. With the dialog flow, it is known beforehand which entities to expect based on the position in the dialog tree. For instance, when the bot/dialog engine asks the user "may I know your name?", then the model may be biased towards expecting a 'PERSON NAME'. The model architecture in FIG. 2 can be modified to accommodate this use case. Specifically, expected output entities for the sentence can be used to identify unique entities in the sentence. These are encoded using multi-hot encoding and input into the system at 225.

In another embodiment, models may be used in an NER service to help anonymize customer data and to remove sensitive data from stored interactions, such as personally identifiable information (PII) (e.g., dates, credit card numbers, social security numbers, US phone numbers, zip codes, emails, locations, proper names, currency values, organizations, etc.)

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 3A, 3B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 3A:
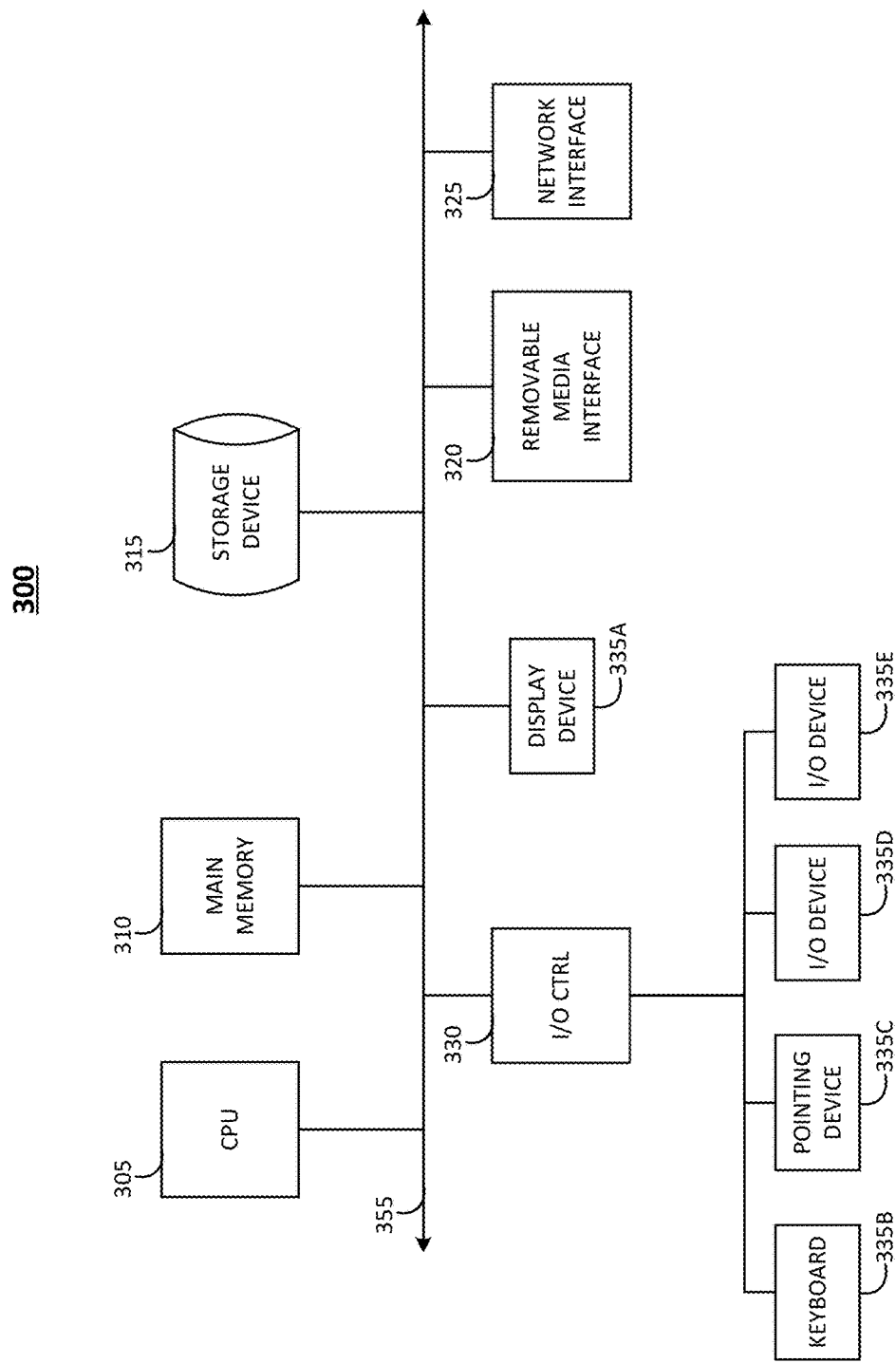
FIG. 3A is a diagram illustrating an embodiment of a computing device.
Figure 3B:
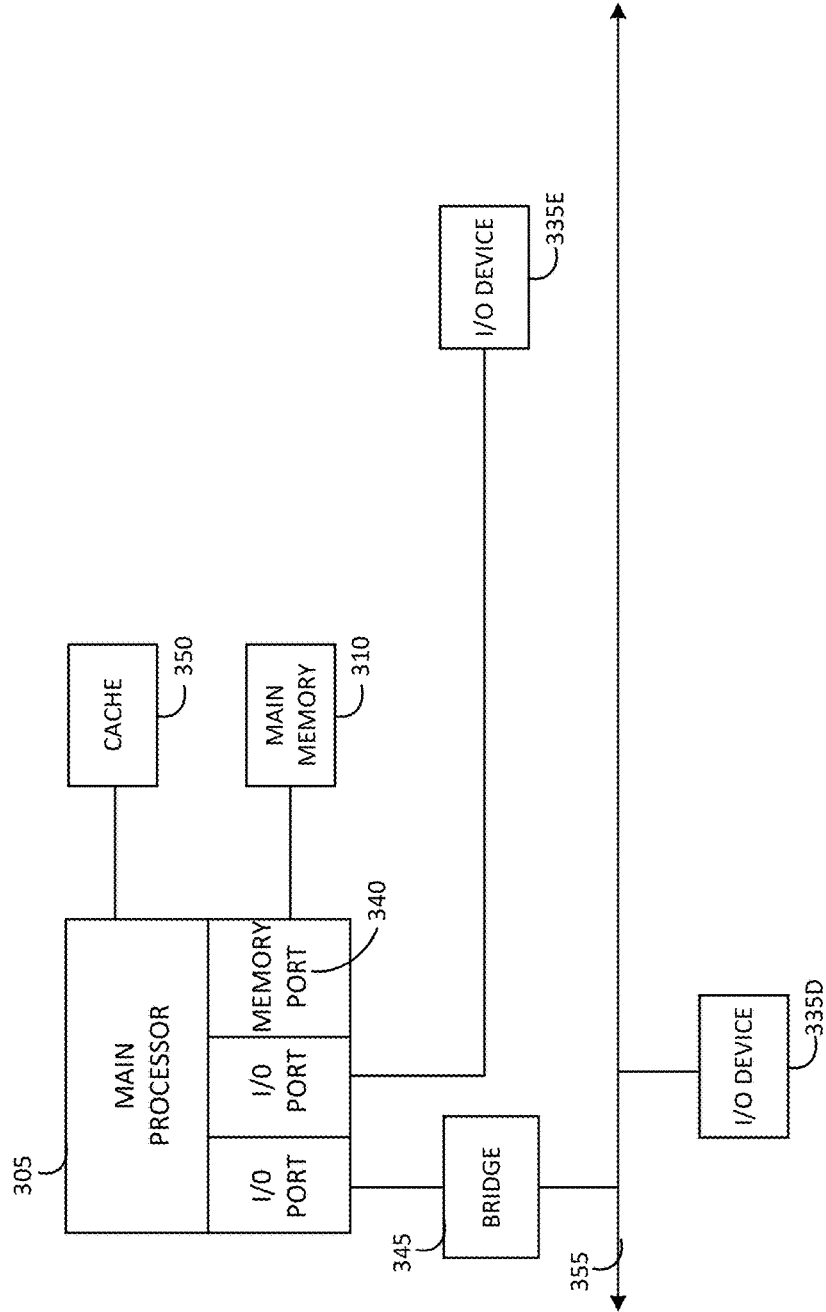
FIG. 3B is a diagram illustrating an embodiment of a computing device.

FIGS. 3A and 3B are diagrams illustrating an embodiment of a computing device as may be employed in an embodiment of the invention, indicated generally at 300. Each computing device 300 includes a CPU 305 and a main memory unit 310. As illustrated in FIG. 3A, the computing device 300 may also include a storage device 315, a removable media interface 320, a network interface 325, an input/output (I/O) controller 330, one or more display devices 335A, a keyboard 335B and a pointing device 335C (e.g., a mouse). The storage device 315 may include, without limitation, storage for an operating system and software. As shown in FIG. 3B, each computing device 300 may also include additional optional elements, such as a memory port 340, a bridge 345, one or more additional input/output devices 335D, 335E, and a cache memory 350 in communication with the CPU 305. The input/output devices 335A, 335B, 335C, 335D, and 335E may collectively be referred to herein as 335.

The CPU 305 is any logic circuitry that responds to and processes instructions fetched from the main memory unit 310. It may be implemented, for example, in an integrated circuit, in the form of a microprocessor, microcontroller, or graphics processing unit, or in a field-programmable gate array (FPGA) or application-specific integrated circuit (ASIC). The main memory unit 310 may be one or more memory chips capable of storing data and allowing any storage location to be directly accessed by the central processing unit 305. As shown in FIG. 3A, the central processing unit 305 communicates with the main memory 310 via a system bus 355. As shown in FIG. 3B, the central processing unit 305 may also communicate directly with the main memory 310 via a memory port 340.

In an embodiment, the CPU 305 may include a plurality of processors and may provide functionality for simultaneous execution of instructions or for simultaneous execution of one instruction on more than one piece of data. In an embodiment, the computing device 300 may include a parallel processor with one or more cores. In an embodiment, the computing device 300 comprises a shared memory parallel device, with multiple processors and/or multiple processor cores, accessing all available memory as a single global address space. In another embodiment, the computing device 300 is a distributed memory parallel device with multiple processors each accessing local memory only. The computing device 300 may have both some memory which is shared and some which may only be accessed by particular processors or subsets of processors. The CPU 305 may include a multicore microprocessor, which combines two or more independent processors into a single package, e.g., into a single integrated circuit (IC). For example, the computing device 300 may include at least one CPU 305 and at least one graphics processing unit.

In an embodiment, a CPU 305 provides single instruction multiple data (SIMD) functionality, e.g., execution of a single instruction simultaneously on multiple pieces of data. In another embodiment, several processors in the CPU 305 may provide functionality for execution of multiple instructions simultaneously on multiple pieces of data (MIMD). The CPU 305 may also use any combination of SIMD and MIMD cores in a single device.

FIG. 3B depicts an embodiment in which the CPU 305 communicates directly with cache memory 350 via a secondary bus, sometimes referred to as a backside bus. In other embodiments, the CPU 305 communicates with the cache memory 350 using the system bus 355. The cache memory 350 typically has a faster response time than main memory 310. As illustrated in FIG. 3A, the CPU 305 communicates with various I/O devices 335 via the local system bus 355. Various buses may be used as the local system bus 355, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 335A, the CPU 305 may communicate with the display device 335A through an Advanced Graphics Port (AGP). FIG. 3B depicts an embodiment of a computer 300 in which the CPU 305 communicates directly with I/O device 335E. FIG. 3B also depicts an embodiment in which local buses and direct communication are mixed: the CPU 305 communicates with I/O device 335D using a local system bus 355 while communicating with I/O device 335E directly.

A wide variety of I/O devices 335 may be present in the computing device 300. Input devices include one or more keyboards 335B, mice, trackpads, trackballs, microphones, and drawing tables, to name a few non-limiting examples. Output devices include video display devices 335A, speakers and printers. An I/O controller 330 as shown in FIG. 3A, may control the one or more I/O devices, such as a keyboard 335B and a pointing device 335C (e.g., a mouse or optical pen), for example.

Referring again to FIG. 3A, the computing device 300 may support one or more removable media interfaces 320, such as a floppy disk drive, a CD-ROM drive, a DVD-ROM drive, tape drives of various formats, a USB port, a Secure Digital or COMPACT FLASH' memory card port, or any other device suitable for reading data from read-only media, or for reading data from, or writing data to, read-write media. An I/O device 335 may be a bridge between the system bus 355 and a removable media interface 320.

The removable media interface 320 may, for example, be used for installing software and programs. The computing device 300 may further include a storage device 315, such as one or more hard disk drives or hard disk drive arrays, for storing an operating system and other related software, and for storing application software programs. Optionally, a removable media interface 320 may also be used as the storage device. For example, the operating system and the software may be run from a bootable medium, for example, a bootable CD.

In an embodiment, the computing device 300 may include or be connected to multiple display devices 335A, which each may be of the same or different type and/or form. As such, any of the I/O devices 335 and/or the I/O controller 330 may include any type and/or form of suitable hardware, software, or combination of hardware and software to support, enable or provide for the connection to, and use of, multiple display devices 335A by the computing device 300. For example, the computing device 300 may include any type and/or form of video adapter, video card, driver, and/or library to interface, communicate, connect or otherwise use the display devices 335A. In an embodiment, a video adapter may include multiple connectors to interface to multiple display devices 335A. In another embodiment, the computing device 300 may include multiple video adapters, with each video adapter connected to one or more of the display devices 335A. In other embodiments, one or more of the display devices 335A may be provided by one or more other computing devices, connected, for example, to the computing device 300 via a network. These embodiments may include any type of software designed and constructed to use the display device of another computing device as a second display device 335A for the computing device 300. One of ordinary skill in the art will recognize and appreciate the various ways and embodiments that a computing device 300 may be configured to have multiple display devices 335A.

An embodiment of a computing device indicated generally in FIGS. 3A and 3B may operate under the control of an operating system, which controls scheduling of tasks and access to system resources. The computing device 300 may be running any operating system, any embedded operating system, any real-time operating system, any open source operation system, any proprietary operating system, any operating systems for mobile computing devices, or any other operating system capable of running on the computing device and performing the operations described herein.

The computing device 300 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 300 may have different processors, operating systems, and input devices consistent with the device.

In other embodiments, the computing device 300 is a mobile device. Examples might include a Java-enabled cellular telephone or personal digital assistant (PDA), a smart phone, a digital audio player, or a portable media player. In an embodiment, the computing device 300 includes a combination of devices, such as a mobile phone combined with a digital audio player or portable media player.

A computing device 300 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 300 communicates with other computing devices 300 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for deriving a model for a chatbot for predicting entities in a given sentence comprising a plurality of words wherein the words are separated by space, the method comprising the steps of:
    inputting the sentence into a named-entity recognition module of the model and truncating the sentence;
    obtaining features from the truncated sentence, wherein the features comprise at least encodings for parts of speech which further comprise tags identifying the parts of speech individually;

performing, with a Long Short-Term Memory Recurring Neural Network of the model, a forward pass on the features to obtain a first set of results;

performing, with the Long Short-Term Memory Recurring Neural Network of the model, a backward pass on the features to obtain a second set of results;

performing a first concatenating on the first set of results and the second set of results;

performing a second concatenation on the first concatenation using output target entities, wherein the output target entities are shifted by one step;

obtaining a fully connected set of neurons from the second concatenation, which are shared across all encoded words;

obtaining, based on the fully connected set of neurons, a plurality of encoded outputs with dimensions equal to the number of entities, and determining at least one of the output target entities based on its position in a dialog tree generated by the model that biases the model towards expecting the identified parts of speech.

2. The method of claim 1, wherein the shifting is performed to the right and zeroes are input into an empty first position.

3. The method of claim 1, wherein the Long Short-Term Memory Recurring Neural Network comprises 100 memory cells.

4. The method of claim 1, wherein the first concatenation results in 200 dimensions.

5. The method of claim 1, wherein the second concatenation results in a number of dimensions proportionally related to a number of features from the truncated sentence.

6. The method of claim 1, wherein the features further comprise one or more of: word embeddings, special character information, digit count information, digit chunks count information, and fixed-size ordinally forgetting encoding.

7. A system for deriving a model for a chatbot for predicting entities in a given sentence comprising a plurality of words wherein the words are separated by space, the system comprising:
a processor; and
a memory in communication with the processor, the memory storing instructions that, when executed by the processor, causes the processor to derive the model by:
inputting the sentence into a named-entity recognition module of the model and truncating the sentence;
obtaining features from the truncated sentence, wherein the features comprise at least encodings for parts of speech which further comprise tags identifying the parts of speech individually;
performing, with a Long Short-Term Memory Recurring Neural Network of the model, a forward pass on the features to obtain a first set of results;
performing, with the Long Short-Term Memory Recurring Neural Network of the model, a backward pass on the features to obtain a second set of results;
performing a first concatenating on the first set of results and the second set of results;
performing a second concatenation on the first concatenation using output target entities, wherein the output target entities are shifted by one step;
obtaining a fully connected set of neurons from the second concatenation, which are shared across all encoded words;
obtaining, based on the fully connected set of neurons, a plurality of encoded outputs with dimensions equal to the number of entities, and
determining at least one of the output target entities based on its position in a dialog tree generated by the model that biases the model towards expecting the identified parts of speech.

8. The system of claim 7, wherein the shifting is performed to the right and zeroes are input into an empty first position.

9. The system of claim 7, wherein the Long Short-Term Memory Recurring Neural Network comprises 100 memory cells.

10. The system of claim 7, wherein the first concatenation results in 200 dimensions.

11. The system of claim 7, wherein the second concatenation results in a number of dimensions proportionally related to a number of features from the truncated sentence.

12. The system of claim 7, wherein the features further comprise one or more of: word embeddings, special character information, digit count information, digit chunks count information, and fixed-size ordinally forgetting encoding.

13. A method for deriving a model for a chatbot for predicting entities in a given sentence comprising a plurality of words wherein the words are separated by space, the method comprising the steps of:
inputting the sentence into a named-entity recognition module of the model and truncating the sentence;
obtaining features from the truncated sentence, wherein the features comprise at least encodings for parts of speech which further comprise tags identifying the parts of speech individually;
performing, with a Long Short-Term Memory Recurring Neural Network of the model, a forward pass on the features to obtain a first set of results;
performing, with the Long Short-Term Memory Recurring Neural Network of the model, a backward pass on the features to obtain a second set of results;
performing a first concatenating on the first set of results and the second set of results;
performing a second concatenation on the first concatenation using output target entities, wherein entities are encoded using multi-hot encoding;
obtaining a fully connected set of neurons from the second concatenation, which are shared across all encoded words;
obtaining, based on the fully connected set of neurons, a plurality of encoded outputs with dimensions equal to the number of entities, and
determining at least one of the output target entities based on its position in a dialog tree generated by the model that biases the model towards expecting the identified parts of speech.

14. The method of claim 13, wherein unique entities are derived from expected output entities for the sentence.

15. The method of claim 13, wherein the Long Short-Term Memory Recurring Neural Network comprises 100 memory cells.

16. The method of claim 13, wherein the first concatenation results in 200 dimensions.

17. The method of claim 13, wherein the second concatenation results in a number of dimensions proportionally related to a number of features from the truncated sentence.

18. The method of claim 13, wherein the features further comprise one or more of: word embeddings, parts-of-speech encoding, special character information, digit count information, digit chunks count information, and fixed-size ordinally forgetting encoding.

19. A system for deriving a model for a chatbot for predicting entities in a given sentence comprising a plurality of words wherein the words are separated by space, the system comprising:

a processor; and a memory in communication with the processor, the memory storing instructions that, when executed by the processor, causes the processor to derive the model by:

inputting the sentence into a named-entity recognition module of the model and truncating the sentence;

obtaining features from the truncated sentence, wherein the features comprise at least encodings for parts of speech which further comprise tags identifying the parts of speech individually;

performing, with a Long Short-Term Memory Recurring Neural Network of the model, a forward pass on the features to obtain a first set of results;

performing, with the Long Short-Term Memory Recurring Neural Network of the model, a backward pass on the features to obtain a second set of results;

performing a first concatenating on the first set of results and the second set of results;

performing a second concatenation on the first concatenation using output target entities, wherein entities are encoded using multi-hot encoding;

obtaining a fully connected set of neurons from the second concatenation, which are shared across all encoded words;

obtaining, based on the fully connected set of neurons, a plurality of encoded outputs with dimensions equal to the number of entities, and determining at least one of the output target entities based on its position in a dialog tree generated by the model that biases the model towards expecting the identified parts of speech.

20. The system of claim 19, wherein the Long Short-Term Memory Recurring Neural Network comprises 100 memory cells.

21. The system of claim 19, wherein the features further comprise one or more of: word embeddings, special character information, digit count information, digit chunks count information, and fixed-size ordinally forgetting encoding.

* * * * *